US012096439B2

(12) United States Patent
Tesanovic et al.

(10) Patent No.: US 12,096,439 B2
(45) Date of Patent: Sep. 17, 2024

(54) METHOD AND DEVICE FOR BUFFER STATUS REPORTING

(71) Applicant: Samsung Electronics Co., Ltd., Suwon-si (KR)

(72) Inventors: Milos Tesanovic, Middlesex (GB); Soenghun Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/266,789

(22) PCT Filed: Aug. 8, 2019

(86) PCT No.: PCT/KR2019/010014
§ 371 (c)(1),
(2) Date: Feb. 8, 2021

(87) PCT Pub. No.: WO2020/032648
PCT Pub. Date: Feb. 13, 2020

(65) Prior Publication Data
US 2021/0345383 A1    Nov. 4, 2021

(30) Foreign Application Priority Data

Aug. 8, 2018   (GB) ...................................... 1812926
Aug. 9, 2018   (GB) ...................................... 1812970

(51) Int. Cl.
*H04W 72/21*    (2023.01)
*H04W 28/02*    (2009.01)
*H04W 76/10*    (2018.01)

(52) U.S. Cl.
CPC ....... *H04W 72/21* (2023.01); *H04W 28/0278* (2013.01); *H04W 76/10* (2018.02)

(58) Field of Classification Search
CPC ............. H04W 72/1284; H04W 76/10; H04W 28/0278; H04W 72/1289; H04W 72/14; H04W 72/21; H04W 72/23; H04L 47/30
See application file for complete search history.

(56) References Cited

U.S. PATENT DOCUMENTS 10,349,436 B2    7/2019    Jang et al.
2011/0055387 A1*    3/2011    Tseng ................ H04W 72/1221
709/224

(Continued)

FOREIGN PATENT DOCUMENTS

CN    103460747 A    12/2013
CN    104320857 A    1/2015

(Continued)

OTHER PUBLICATIONS

CATT, Discussion on BSR Transmission and Cancellation, 3GPP Draft R2-1707919, 3GPP TSG-RAN WG2 Meeting #99, Agenda Item 10.3.1.6, Aug. 21, 2017, XP051317854.

(Continued)

*Primary Examiner* — Nizar N Sivji
*Assistant Examiner* — Dinh Nguyen
(74) *Attorney, Agent, or Firm* — Jefferson IP Law, LLP

(57) ABSTRACT

Embodiments herein provide a method for buffer status reporting. The method includes triggering a buffer status report (BSR) in a media access control (MAC) layer, based on a BSR triggering condition; transmitting, to a base station, a scheduling request (SR) for transmitting uplink data; receiving an uplink resource allocation grant (UL grant) from the base station, based on the SR; assembling a media access control protocol data unit (MAC PDU); transmitting the MAC PDU; and determining whether to cancel the triggered BSR, based on a BSR MAC control element (BSR MAC CE) included in the MAC PDU.

13 Claims, 10 Drawing Sheets

(56) References Cited

U.S. PATENT DOCUMENTS

| | | | | |
|---|---|---|---|---|
| 2011/0310937 | A1* | 12/2011 | Lin | H04W 28/0278 375/219 |
| 2012/0314672 | A1* | 12/2012 | Chen | H04W 74/002 370/329 |
| 2014/0133447 | A1* | 5/2014 | Moulsley | H04W 72/1278 370/329 |
| 2014/0177560 | A1* | 6/2014 | Guo | H04W 52/365 370/329 |
| 2014/0293896 | A1 | 10/2014 | Kuo | |
| 2016/0128094 | A1 | 5/2016 | Lee et al. | |
| 2016/0374110 | A1* | 12/2016 | Lee | H04W 72/1247 |
| 2017/0238337 | A1 | 8/2017 | Lee et al. | |
| 2017/0245245 | A1 | 8/2017 | Kim et al. | |
| 2017/0310433 | A1 | 10/2017 | Dinan | |
| 2017/0310531 | A1 | 10/2017 | Dinan | |
| 2018/0199230 | A1 | 7/2018 | Lee et al. | |
| 2018/0324635 | A1* | 11/2018 | Babaei | H04W 24/10 |
| 2020/0008218 | A1* | 1/2020 | Shih | H04W 72/23 |
| 2021/0219323 | A1 | 7/2021 | Ostergaard et al. | |
| 2023/0284317 | A1 | 9/2023 | Kwon | |

FOREIGN PATENT DOCUMENTS

| | | |
|---|---|---|
| CN | 107079469 A | 8/2017 |
| CN | 107852638 A | 3/2018 |
| EP | 2 693 821 A1 | 2/2014 |
| KR | 10-2016-0018309 A | 2/2016 |
| WO | 2018/169277 A1 | 9/2018 |

OTHER PUBLICATIONS

United Kingdom Search Report dated Feb. 6, 2019, issued in United Kingdom Patent Application No. GB1812970.0.
Samsung Electronics R&D Institute UK, 'Alignment of SR and BSR cancellation conditions', R2-1809565, 3GPP TSG RAN WG2 NR ad-hoc #18-07, Montreal, Canada, Jun. 21, 2018, See pp. 1-5.
Ericsson, 'Discussion on alignment of SR and BSR cancellation conditions', R2-1810088, 3GPP TSG RAN WG2 NR ad-hoc #18-07, Montreal, Canada, Jun. 22, 2018, See sections 1-2.
Interdigital Inc., 'SR Triggering in NR', R2-1802809, 3GPP TSG RAN, WG2 #101, Athens, Greece, Feb. 16, 2018, See sections 1-2.
Huawei et al., 'BSR procedure', R2-1710203, 3GPP TSG RAN WG2 #99bis, Prague, Czekh, Sep. 29, 2017, See sections 1-2.2.
LG Electronics Inc., Clarification of BSR cancellation conditions, R2-1810459, 3GPP TSG-RAN WG2 NR Ad Hoc 1807 Montreal, Canada, Jul. 2-6, 2018.
Technical Specification Group Radio Access Network, 3GPP TS 38.321, V15.2.0, Medium Access Control (MAC) protocol specification, Jun. 2018.
Extended European Search Report dated Sep. 23, 2021, issued in European Patent Application No. 19847233.4.
Indian Office Action dated Oct. 31, 2022, issued in Indian Patent Application No. 202117005620.
European Notice of Allowance dated Mar. 2, 2023, issued in European Application No. 19847233.4.
Samsung Electronics R&D Institute UK, Alignment of SR and BSR cancellation conditions, R2-1810800, 3GPP TSG-RAN WG2 NR ad-hoc #18-07, Montreal, Canda, Jul. 9, 2018.
European Notice of Allowance dated Jul. 26, 2023, issued in European Application No. 19847233.4.
Chinese Office Action dated Sep. 21, 2023, issued in Chinese Application No. 201980053923.4.
European Search Report dated Oct. 18, 2023, issued in European Application No. 23183205.6.
Chinese Notice Of Allowance dated Apr. 15, 2024, issued in Chinese Application No. 201980053923.4.
Chinese Office Action dated Feb. 8, 2024, issued in Chinese Application No. 201980053923.4.

\* cited by examiner

METHOD AND DEVICE FOR BUFFER STATUS REPORTING

TECHNICAL FIELD

The present disclosure relates to buffer status reporting during uplink scheduling in a wireless communications network.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE OF INVENTION

Brief Description of Drawings

Embodiments of the disclosure are further described hereinafter with reference to the accompanying drawings, in which.

BEST MODE FOR CARRYING OUT THE INVENTION

Figure 1:
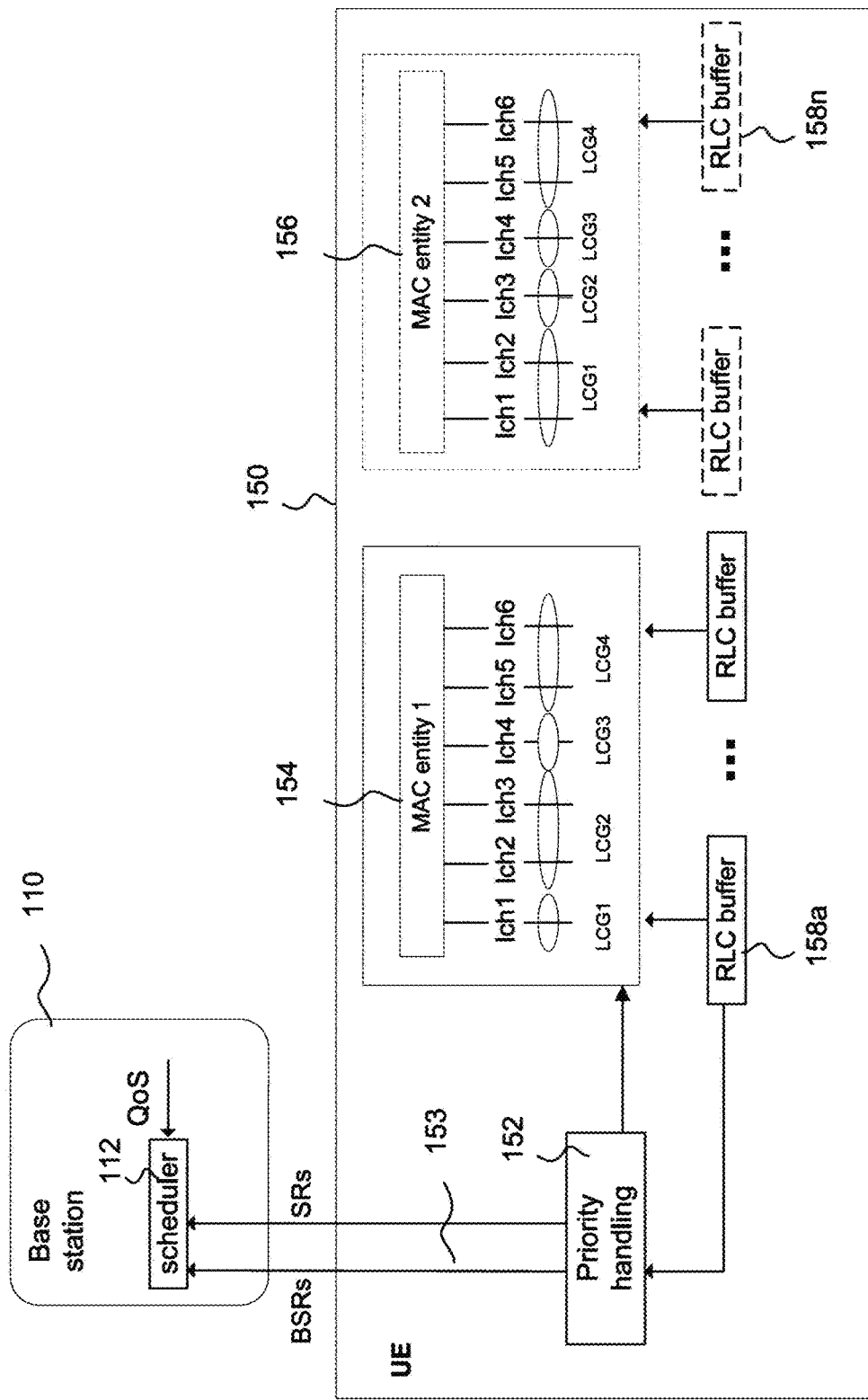
FIG. 1 schematically illustrates uplink scheduling between a base station and a UE.

According to the present disclosure, a user equipment, UE, for a wireless communication system, the UE being capable of dual connectivity to two different Radio Access Technologies, the UE comprising: a Radio Frequency hardware unit; and processing circuitry to control the Radio Frequency hardware unit, wherein the processing circuitry is to: implement a first MAC entity corresponding to a first Radio Access Technology, RAT, type and a second MAC entity corresponding to a second different RAT technology type; trigger a Buffer Status Report, BSR, using at least one of the first MAC entity and the second MAC entity, the trigger being responsive to buffering of data awaiting UL transmission, the data having a split bearer type or a direct bearer type; assemble a MAC PDU in at least one of the first MAC entity and the second MAC entity and, if the MAC PDU comprises a BSR MAC Control Element providing information on UL buffer contents corresponding to at least one of the first RAT and the second RAT, select a BSR trigger cancellation policy selection of the policy depending both on the Radio Access Technology type of the MAC entity used for assembly of the MAC PDU and on the bearer type.

Wherein the selected BSR trigger cancellation is to be performed at the assembly of the MAC PDU assembly or at a subsequent transmission of the MAC PDU.

Wherein one of the first MAC entity and the second MAC entity is an LTE MAC entity and the other of the first MAC entity and the second MAC entity is a New Radio MAC entity.

Wherein the MAC PDU is assembled only in a New Radio MAC entity and wherein the BSR cancellation test comprises determining if the BSR MAC CE included buffer status information for all Logical Channel Groups which at a time when the MAC PDU was assembled had buffered data for UL transmission.

Wherein when the BSR cancellation test confirms that the BSR MAC Control Element did include buffer status information of all Logical Channel Groups having buffered data for UL transmission at a time when the MAC PDU was assembled, the processing unit is to cancel all pending BSRs triggered up to a time of the MAC PDU assembly.

Wherein when the BSR cancellation test determines that the BSR MAC CE excluded buffer status information of at least one Logical Channel Group that had buffered data for UL transmission at a time when the MAC PDU was assembled, the processing circuitry is to suppress cancellation of at least a subset of the pending triggered BSRs.

Wherein the UE has dual connectivity to an LTE base station and a new Radio base station and wherein the buffered data for UL transmission corresponds to a direct bearer and wherein the BSR cancellation test comprises associating the MAC PDU with either the LTE base station or the New Radio base station.

Wherein the BSR cancellation test is to associate the MAC PDU with the LTE base station if at least one of: the MAC PDU is transmitted over an LTE cell, transmitted over an LTE cell group or assembled by the LTE MAC entity.

Wherein responsive to an outcome of the BSR cancellation test associating the MAC PDU with the LTE base station, the processing circuitry is to cancel all previously triggered BSRs if the MAC PDU contains a MAC BSR CE.

Wherein the BSR is to associate the MAC PDU with the New Radio base station if at least one of: the MAC PDU is transmitted over a New radio cell, transmitted over a New Radio cell group or assembled by the New Radio MAC entity.

Wherein responsive to an outcome of the BSR cancellation test associating the MAC PDU with the New Radio base station, the processing circuitry is to determine if the BSR MAC CE included buffer status information for all Logical Channel Groups of the New Radio UE MAC entity having buffered data for UL transmission at a time when the MAC PDU was assembled.

Wherein when the BSR cancellation test determines that the BSR MAC CE excluded buffer status information of at least one Logical Channel Group that had buffered data for UL transmission at a time when the MAC PDU was assembled, the processing circuitry is to suppress cancellation of all pending BSRs triggered prior to MAC PDU assembly for the New Radio MAC entity.

Wherein the processing circuitry is further to suppress cancellation of a subset of pending triggered scheduling requests for the New Radio MAC entity and corresponding to the excluded buffer status information and to ensure continued running of each respective sr-ProhibitTimer.

Wherein when the BSR cancellation test confirms that the BSR MAC CE did include buffer status information of all Logical Channel Groups having buffered data at a time when the MAC PDU was assembled, the processing unit is to cancel all BSRs triggered for the New Radio MAC entity up to a time of the MAC PDU assembly.

Wherein the processing circuitry is further to cancel all scheduling requests for the New Radio MAC entity up to a time of the MAC PDU assembly and to stop each respective sr-ProhibitTimer.

Wherein the UE has dual connectivity to an LTE base station and a new Radio base station and wherein the buffered data for UL transmission corresponds to a split bearer and wherein BSR MAC CEs pertaining to arrival of data for the split bearer are transmitted over one or the other of the NR cell and the LTE cell.

Wherein the BSR cancellation test is to associate the MAC PDU with the LTE base station if at least one of: the MAC PDU is transmitted over an LTE cell, transmitted over an LTE cell group or assembled by the LTE MAC entity.

Wherein responsive to an outcome of the BSR cancellation test associating the MAC PDU with the LTE base station, the processing circuitry is to cancel all previously triggered BSRs for both the LTE MAC entity and the New Radio MAC entity.

Wherein the BSR is to associate the MAC PDU with the New Radio base station if at least one of: the MAC PDU is transmitted over a New radio cell, transmitted over a New Radio cell group or assembled by the New Radio MAC entity.

Wherein responsive to an outcome of the BSR cancellation test associating the MAC PDU with the New Radio base station, the processing circuitry is to determine if the BSR MAC CE included buffer status information for all Logical Channel Groups having buffered data at a time when the MAC PDU was assembled.

Wherein when the BSR cancellation test determines that the BSR MAC CE excluded buffer status information of at least one Logical Channel Group of either the LTE MAC entity or the New Radio MAC entity that had buffered data at a time when the MAC PDU was assembled, the processing circuitry is to suppress cancellation of pending triggered BSRs for both the LTE MAC entity and the New radio MAC entity.

Wherein when the BSR cancellation test confirms that the BSR MAC CE did include buffer status information of all Logical Channel Groups having buffered data at a time when the MAC PDU was assembled, the processing unit is to cancel all BSRs triggered for both the LTE MAC entity and the New radio MAC entity up to a time of the MAC PDU assembly.

Wherein BSR trigger(s) corresponding to one of the LTE MAC entity and the New Radio MAC entity are duplicated on the other of the LTE MAC entity and the New Radio MAC entity and wherein the duplicated BSR trigger(s) cause the processing circuitry to generate a respective MAC PDU in both the New Radio MAC entity and the LTE MAC entity.

Wherein the BSR cancelation test comprises determining that the UL data corresponds to a dual connection split bearer for which the buffered data threshold has been exceeded and selecting an identical BSR cancellation mechanism for both the LTE MAC entity and the New Radio MAC entity.

Wherein the identical BSR cancellation mechanism is selected from an LTE cancellation mechanism comprising cancelling all previously triggered BSRs if the MAC PDU contains a MAC BSR CE or a New Radio cancellation mechanism comprising selectively cancelling or suppressing cancellation of BSR triggers generated prior to assembly of the MAC PDUs depending on an outcome of a check if the BSR MAC CE included all Logical Channel Groups having data available for transmission when the respective MAC PDU was assembled.

According to the another embodiment of the present disclosure, a method of UL scheduling management in a UE of a wireless communications network, the UE being capable of dual connectivity to two different Radio Access Technologies, the method comprising: implementing a first MAC entity corresponding to a first Radio Access Technology type and a second MAC entity corresponding to a second different Radio Access technology type; triggering a Buffer Status Report, BSR, using at least one of the first MAC entity and the second MAC entity, the trigger being responsive to buffering of data awaiting UL transmission, the data having a split bearer type or a direct bearer type; assemble a MAC PDU in at least one of the first MAC entity and the second MAC entity and, if the MAC PDU comprises a BSR MAC Control Element providing information on UL buffer contents corresponding to at least one of the first RAT and the second RAT; and selecting a BSR trigger cancellation policy, selection of the policy depending both on the Radio Access Technology type of the MAC entity used for assembly of the MAC PDU and on the bearer type.

Wherein the selected BSR trigger cancellation is to be performed at the assembly of the MAC PDU assembly or at a subsequent transmission of the MAC PDU.

Wherein one of the first MAC entity and the second MAC entity is an LTE MAC entity and the other of the first MAC entity and the second MAC entity is a New Radio MAC entity.

Wherein the MAC PDU is assembled only in a New Radio MAC entity and wherein the BSR cancellation test comprises determining if the BSR MAC CE included buffer status information for all Logical Channel Groups having buffered data for UL transmission at a time when the MAC PDU was assembled.

According to the another embodiment of the present disclosure, a user equipment, UE, for a wireless communication system, the UE comprising: a Radio Frequency hardware unit; and processing circuitry to control the Radio Frequency hardware unit, wherein the processing circuitry is to: trigger, via a Media Access Control, MAC, entity, a Buffer Status Report, BSR, the trigger being responsive to buffering of data awaiting uplink, UL, transmission; assemble a MAC Packet Data Unit, PDU and, if the MAC PDU contains a BSR MAC Control Element providing BSR information, perform a BSR trigger cancellation test to determine if the BSR MAC Control Element included buffer status information for all Logical Channel Groups which at the time when the MAC PDU was assembled had buffered data for UL transmission and to perform BSR trigger cancellation depending on an outcome of the BSR trigger cancellation test.

Wherein the BSR trigger cancellation test is performed at a MAC PDU assembly stage or at a MAC PDU transmission stage.

Wherein when the BSR trigger cancellation test confirms that the BSR MAC CE did include buffer status information of all Logical Channel Groups which at a time when the MAC PDU was assembled had buffered data for UL transmission, the processing unit is to cancel all BSR triggered prior to the assembly of the MAC PDU.

Wherein when the BSR trigger cancellation test determines that the BSR MAC CE excluded buffer status information of at least one Logical Channel Group that had buffered data for UL transmission, the buffer status triggers issued prior to the assembly of the MAC PDU are not cancelled.

Wherein the processing circuitry is further to at least one of: prevent cancellation of one or more pending scheduling requests for MAC entity; keep all pending SRs triggered prior to MAC PDU assembly; and keep all pending SRs corresponding to the BSR triggers that are not cancelled.

Wherein the processing circuitry is to ensure continued running of a respective sr-ProhibitTimer for each scheduling request for which cancellation is prevented.

Wherein the UE has dual connectivity to an LTE base station and a new Radio base station and comprises an LTE MAC entity and a New Radio MAC entity and wherein the BSR trigger is responsive to buffering of UL data for a direct bearer and wherein the BSR cancellation test is invoked when the MAC PDU assembly is performed by a New Radio MAC entity of the UE or when the MAC PDU is to be transmitted over a New radio cell or over a New Radio cell group.

Wherein a further different BSR cancellation test is t performed if at least one of: the MAC PDU is transmitted over an LTE cell, transmitted over an LTE cell group or the MAC PDU assembly is performed by the LTE MAC entity of the UE.

Wherein when according to the further different BSR cancellation test, the processing circuitry is to cancel all previously issued BSR triggers in the LTE MAC entity if the MAC PDU contains a BSR MAC CE.

Wherein the implemented BSR cancellation test is to determine if the BSR MAC CE included buffer status information for all Logical Channel Groups of the New Radio MAC entity of the UE having buffered data for UL transmission at a time when the MAC PDU was assembled.

Wherein when the BSR cancellation test determines that the BSR MAC CE excluded buffer status information of at least one Logical Channel Group that had buffered data at a time when the MAC PDU was assembled, any pending BSR triggers issued by the New Radio MAC entity prior to the assembly of the MAC PDU are retained.

Wherein the processing circuitry is further to prevent cancellation of one or more pending scheduling requests for the New Radio MAC entity corresponding to the retained BSR triggers.

Wherein the processing circuitry is to ensure continued running of a respective sr-ProhibitTimer for each scheduling request for which cancellation is prevented.

Wherein when the BSR cancellation test confirms that the BSR MAC CE did include buffer status information of all Logical Channel Groups of the New Radio MAC entity having buffered data at a time when the MAC PDU was assembled, the processing unit is to cancel all pending BSR triggers for the New Radio MAC entity issued prior to the MAC PDU assembly.

Wherein the processing circuitry is further to cancel all pending scheduling requests for the New Radio MAC entity issued prior to the MAC PDU assembly and to stop each respective sr-ProhibitTimer.

Wherein the UE has dual connectivity to an LTE base station and a New Radio base station and comprises an LTE MAC entity and an New Radio MAC entity and wherein the BSR trigger is responsive to buffering of UL data for a split bearer and wherein the BSR cancellation test is invoked when the MAC PDU assembly is performed by the New Radio MAC entity of the UE or when the MAC PDU is to be transmitted over a New radio cell or transmitted over a New Radio cell group Wherein the UE has dual connectivity to an LTE base station and a New Radio base station and comprises an LTE MAC entity and an New Radio MAC entity and wherein the BSR trigger is responsive to buffering of UL data for a split bearer and wherein the BSR cancellation test is invoked for both BSRs triggers generated by the New Radio MAC entity and BSR triggers generated by the LTE MAC entity when an UL buffer threshold is exceed.

Wherein when the BSR cancellation test determines that the BSR MAC CE excluded buffer status information of at least one Logical Channel Group of either the LTE MAC entity or the New Radio MAC entity that had buffered data at a time when the MAC PDU was assembled, the buffer status triggers issued prior to the assembly of the MAC PDU are not cancelled for both the LTE MAC entity and the New radio MAC entity.

Wherein when the BSR cancellation test confirms that the BSR MAC CE did include buffer status information of all Logical Channel Groups having buffered data at a time when the MAC PDU was assembled, the processing unit is to cancel all pending BSRs triggered for both the LTE MAC entity and the New radio MAC entity up to a time of the MAC PDU assembly.

Wherein the cancellation test applies only to LCGs containing data from the split bearer.

According to the another embodiment of the present disclosure, a method of UL scheduling management in a UE of a wireless communications network, the method comprising: triggering, via a Media Access Control, MAC, entity, a Buffer Status Report, BSR, the trigger being responsive to buffering of data awaiting uplink, UL, transmission; assembling a MAC Packet Data Unit, PDU, comprising a BSR MAC Control Element providing BSR information; and performing a BSR trigger cancellation test to determine if the BSR MAC Control Element included buffer status information for all Logical Channel Groups having buffered data for UL transmission when the MAC PDU was assembled; and performing BSR trigger cancellation depending on an outcome of the BSR trigger cancellation test.

Wherein the BSR trigger cancellation test is performed at a MAC PDU assembly stage or at a MAC PDU transmission stage.

Wherein when the BSR trigger cancellation test confirms that the BSR MAC CE did include buffer status information of all Logical Channel Groups having buffered data for UL transmission at a time when the MAC PDU was assembled, the processing unit is to cancel all BSR triggered prior to the assembly of the MAC PDU.

Wherein when the BSR trigger cancellation test determines that the BSR MAC CE excluded buffer status information of at least one Logical Channel Group that had buffered data for UL transmission at the time of MAC PDU assembly, any pending buffer status triggers issued prior to the assembly of the MAC PDU are not cancelled.

According to the another embodiment of the present disclosure, a method of reporting a buffer status of a terminal, the method comprising: triggering a buffer status report (BSR) in a media access control (MAC) layer, based on a BSR riggering condition; transmitting, to a base station, a scheduling request (SR) for transmitting uplink data; receiving an uplink resource allocation grant (UL grant) from the base station, based on the SR; assembling a media access control protocol data unit (MAC PDU); transmitting the MAC PDU; and determining whether to cancel the triggered BSR, based on a BSR MAC control element (BSR MAC CE) included in the MAC PDU.

Wherein the determining of whether to cancel the triggered BSR comprises canceling the triggered BSR, based on whether the BSR MAC CE contains buffer status information up to a certain event that triggers a BSR prior to the assembly of the MAC PDU.

The method further comprises canceling the triggered BSR when the uplink resource allocation grant is able to accommodate all pending data available for uplink transmission and is not sufficient to accommodate the BSR MAC CE and a MAC sub-header.

The method further comprises triggering the SR, based on a certain SR triggering condition; determining whether the triggered SR has been triggered prior to the assembly of the MAC PDU; and determining whether to cancel the triggered SR, based on a result of the determination whether the triggered SR has been triggered prior to the assembly of the MAC PDU.

Wherein the determining of whether to cancel the triggered SR comprises canceling the triggered SR, based on whether the BSR MAC CE contains buffer status information up to a certain event that triggers a BSR prior to the assembly of the MAC PDU.

The method further comprises canceling the triggered SR when the uplink resource allocation grant is able to accommodate all pending data available for uplink transmission.

The method further comprises stopping an sr-Prohibit-Timer, when it is determined that the triggered SR is cancelled.

Wherein the determining of whether to cancel the triggered BSR is performed when the MAC PDU is transmitted to the base station.

Wherein the determining of whether to cancel the triggered SR is performed when the MAC PDU is transmitted to the base station.

Wherein the triggering of the BSR is performed after the MAC PDU is assembled and before the MAC PDU is transmitted.

According to the another embodiment of the present disclosure, a UE for reporting a buffer status, the terminal comprising: a transceiver; and one or more processors coupled with the transceiver, wherein the processor is configured to: trigger a buffer status report (BSR) in a media access control (MAC) layer, based on a BSR triggering condition; transmit, to a base station, a scheduling request (SR) for transmitting uplink data; receive an uplink resource allocation grant (UL grant) from the base station, based on the SR; assemble a media access control protocol data unit (MAC PDU); transmit the MAC PDU; and determine whether to cancel the triggered BSR, based on a BSR MAC control element (BSR MAC CE) included in the MAC PDU.

Wherein the processor is further configured to cancel the triggered BSR, based on whether the BSR MAC CE contains buffer status information up to a certain event that triggers a BSR prior to the assembly of the MAC PDU.

Wherein the processor is further configured to cancel the triggered BSR when the uplink resource allocation grant is able to accommodate all pending data available for uplink transmission and is not sufficient to accommodate the BSR MAC CE and a MAC sub-header.

Wherein the processor is further configured to: trigger the SR, based on a certain SR triggering condition; determine whether the triggered SR has been triggered prior to the assembly of the MAC PDU; and determine whether to cancel the triggered SR, based on a result of the determination whether the triggered SR has been triggered prior to the assembly of the MAC PDU.

Wherein the processor is further configured to cancel the triggered SR, based on whether the BSR MAC CE contains buffer status information up to a certain event that triggers a BSR prior to the assembly of the MAC PDU.

Wherein the processor is further configured to cancel the triggered SR when the uplink resource allocation grant is able to accommodate all pending data available for uplink transmission.

Wherein the processor is further configured to stop an sr-ProhibitTimer, when it is determined that the triggered SR is cancelled.

Wherein the determination as to whether to cancel the triggered BSR is performed when the MAC PDU is transmitted to the base station.

Wherein the determination as to whether to cancel the triggered SR is performed when the MAC PDU is transmitted to the base station.

Wherein the BSR is triggered after the MAC PDU is assembled and before the MAC PDU is transmitted.

MODE FOR THE INVENTION

Wireless or mobile (cellular) communications networks in which a mobile terminal (UE, such as a mobile handset) communicates via a radio link with a network of base stations or other wireless access points connected to a telecommunications network, have undergone rapid development through a number of generations. Second Generation (2G) digital systems such as Global System for Mobile communications (GSM) have been largely replaced or augmented by Third Generation (3G) digital systems such as the Universal Mobile Telecommunications System (UMTS), which uses a Universal Terrestrial Radio Access Network (UTRAN) radio access technology and a similar core network to GSM. UMTS is specified in standards produced by the 3 rd Generation Partnership Project (3GPP). 3GPP design, specify and standardise technologies for mobile wireless communications networks. Fourth Generation (4G) systems are now widely deployed to provide greater throughput of data. 3GPP standards for 4G systems including an Evolved Packet Core (EPC) and an Enhanced-UTRAN (E-UTRAN) radio access network. The E-UTRAN uses Long Term Evolution (LTE) radio technology, which offers potentially greater capacity and additional features compared with previous standards. LTE is commonly used to refer to the whole system including both the EPC and the E-UTRAN, and LTE is used in this sense in the remainder of this specification, and also should be taken to include LTE enhancements such as LTE Advanced which offers still higher data rates compared to LTE. LTE Advanced is defined by 3GPP standards releases from 3GPP Release 10 and considered to be a 4G mobile communication system by the International Telecommunication Union (ITU).

The trend towards greater data throughput continues with current research to develop Fifth Generation (5G) network technologies, sometimes denoted "New Radio" (NR) network technologies. While the form that 5G networks may take is not fully defined, it is probable that 5G networks will include the capacity to provide extremely high data rates to mobile users in relatively compact geographical areas. To meet the continually increasing demand for higher data rates and higher volumes of data transmitted through wireless communication systems, one option is to use a wider frequency band, such as may be available in the Extremely High Frequency (EHF) band (roughly in the 30-300 GHz range). Radio waves in this band range from 10 mm to 1 mm and so the band is sometimes referred to as the millimetre band or millimetre wave (mm-wave). As one example, unlicensed spectrum around 60 GHz may be exploited to provide a high data rate service in a small cell.

Radio waves in the 60 GHz band are subject to high atmospheric attenuation due to absorption by gases in the atmosphere and so are limited in range, though with the benefit of allowing for smaller frequency reuse distances. EHF transmissions are also substantially line of sight and are readily blocked by objects in their path or reflected or diffracted by building edges. These limitations on EHF transmissions may be mitigated through the use of beam-forming which can increase effective transmission range. Beam-forming may also be exploited at lower frequencies for the purpose of enhanced frequency reuse. Transmission beam-forming concentrates a reach region of a radio wave in a specific direction using a plurality of antennas (an antenna array). Reception beam-forming concentrates the reception of radio waves from an intended direction using a reception antenna array. One way in which beam-forming can be exploited is through the deployment of small cells, (referred to as millimetre wave Small Cells (mmSCs) where utilising mm-wave frequency). Each mmSC communicates with a UE through the use of a directional beam pair in which respective transmission and reception beams are selected to provide for maximum received signal strength based on the known or estimated locations of the UE and the mmSC.

One option that has been proposed for a 5G RAT is to combine a mm-wave network with an overlaid conventional cellular network such as LTE. The UE may have dual RF interfaces for the LTE link and the mm-wave link respectively, referred to as Inter RAT (IRAT) dual connectivity (IRAT aggregation). An ability for a mobile device to connect simultaneously to LTE and 5G New Radio is referred to as "EN-DC", which stands for E-UTRAN New Radio-Dual Connectivity. In previous approaches a mobile terminal would connect to only one technology at a time: GSM, UMTS or LTE. 3GPP TS 37.340 (version 15.2.0 of June 2018) describes LTE and NR multiconnectivity including general principles in section 4.1.

Uplink scheduling in 5G and in LTE both make use of Buffer Status Reports (BSR) from the UE to a serving base station to report a quantity of data available for transmission in uplink buffers of a UE. In this specification, the terms LTE base station and NR base station are uses to refer to transmission-reception points for the corresponding Radio Access technology. LTE base stations may alternatively be denoted eNodeBs or eNBs and NR base stations may alternatively be denoted 5G base stations gNodeBs or gNBs. The BSR is a Media Access Control (MAC) layer message indicating to the LTE base station or to the NR base station the volume of data to transmit. Responsive to a Scheduling Request sent from the UE to a connected base station after generation of a BSR trigger by the UE and if there are no uplink grant(s) already scheduled or configured, the network allocates a certain amount of UL Grant (e.g. resources for PUSCH) if the resource is available. The BSR trigger may be viewed as an internal UE signal. This makes efficient use of resources by only allocating resources when there is UL data awaiting transmission and not allocating more resources than needed. A MAC PDU containing BSR information in a Buffer Status Report Medium Access Control Element (BSR MAC CE) may be transmitted to the base station using the allocated UL resources depending on the size of the UL grant. When the MAC PDU including a BSR MAC CE is transmitted, at least some previously triggered BSRs may be cancelled. It is desirable to ensure that the serving LTE base station and/or NR base station efficiently receive buffer status information for all logical channels.

FIG. 1 schematically illustrates uplink scheduling between a base station and a UE. The base station 110 may be an LTE base station or an NR base station. The base station 110 has a scheduler 112 that makes UL resource scheduling allocations to a UE 150. The UE 150 comprises a priority handling unit 152, a first MAC entity 154, an optional second different MAC entity 156 and a plurality of Radio Link Control (RLC) buffers 158a, 158b, 졀, 158n. The uplink scheduler 112 dynamically controls which UEs are to transmit on their uplink shared channel and on which uplink time and frequency resources. The base station scheduler 112 determines a transport format for the UE but the uplink scheduling decision is taken per UE rather than per radio bearer. Thus, the base station 110 controls a payload of a scheduled UE, but the UE 150 itself is responsible for generating a MAC PDU, by selecting from which radio bearers the data is taken based on strict rules defined in the 3GPP specifications. The base station scheduler 112 may allocate uplink resources to take into account quality of service (QoS) requirements.

The first MAC entity 154 may be associated with the base station 110 and this MAC entity has six logical channels, which have been sub-divided into four Logical Channel Groups (LCGs). The second different MAC entity 156 also has six logical channels and four differently assigned LCGs. From a scheduling perspective, buffer information from each logical channel is beneficial although this could result in too much overhead. Logical channels are therefore grouped into LCGs and the reporting is done per group. A buffer-size field in a buffer status report indicates an amount of data awaiting transmission across all logical channels in a logical-channel group. The first MAC entity 154 may be associated with an LTE base station whereas the second MAC entity 156 may be associated with an NR base station or vice versa. However, in some embodiments there is only a single MAC entity, which is an NR MAC entity. The UE in some embodiments may be a single connectivity NR (or 5G) terminal. In one configuration the EN-DC is deployed with the LTE network as the core network so that the LTE base station represents a Master Node and the NR base station represents a Secondary Node. However, alternative deployments may have a 5G core network in which the Master Node is the NR base station and the Secondary node is an LTE base station.

If the two different MAC entities 154, 156 implement different BSR cancellation mechanisms and yet generate BSR triggers in a coordinated way, problems can arise where a BSR trigger is cancelled in one MAC entity but remains triggered in the other MAC entity.

The UL resource grant allocated by the base station 110 may be used by the UE to transmit a BSR MAC CE specifying the quantity of data in the RLC buffers 158a to 158n awaiting transmission.

In terms of data structure of BSRs to be included in the MAC PDU and a BSR MAC CE, there are a number of different types of BSR: Long BSRs, Short BSRs, Padding BSRs, Truncated BSRs, Periodic BSRs and Regular BSRs.

A Short BSR informs the base station about amount of data in UL buffer only for one specific LCG of a plurality of possible LCGs and includes an LCG identifier field. A Long BSR includes an amount of buffered data in each of the full set of LCGs and has, for example, a six-bit field to specify a buffer size for each of four LCGs.

There are a number of "triggers" in the UE that may prompt the UE to send a BSR to a base station corresponding to a connected radio bearer. The BSR trigger conditions are described in 3GPP TS 36.321 version 11.5.2.0 of July 2018 section 5.4.5 for LTE and in 3GPP TS 38.321 version 15.2.0 of June 2018 section 5.4.5 for NR (5G). A summary of BSR triggers is as follows:

UE has UL data available for transmission and either (i) the new UL data belongs to a higher priority logical channel that logical channels associated with an LCG that does have available UL data; or (ii) none of the logical channels belonging to an LCG contain any available UL data. (a Regular BSR)

UE already has an UL Grant and the padding data is larger than the size of BSR MAC CE and the subheader (a Padding BSR).

There are some cases where network sends an UL grant when UE does not have any data to transmit. In this case UE transmits all zeroes data or some garbage data and long padding zeroes. In this situation, the UE may include a BSR MAC CE as part of a MAC PDU and set the BSR index values all to zero.

A timer, "retxBSR-Timer" has expired and the UE has some data to transmit (a Regular BSR)

A timer controlling periodic transmission of BSRs, "periodicBSR-Timer" has expired (a Periodic BSR)

In some situations, a Long BSR will be sent to the base station by the UE, whereas in other circumstances a Short BSR will be sent. In the case of a Regular BSR and a Periodic BSR, the decision to send a long or a Short BSR may be summarised as follows:

if(the number of LCG with allocated data >1)→Long BSR else →Short BSR

This long or Short BSR type determination is based solely on the number of LCGs having buffered data awaiting transmission and takes no account of the size of the UL grant.

However, for a Padding BSR (rather than a Regular BSR or a Periodic BSR) the decision on whether to send a Long BSR, a Short BSR or a further type denoted a "Truncated BSR" is made differently. In particular, the following algorithm may apply to deciding on a type of Padding BSR:

```
if( the number of padding bit >= the size of the Short BSR plus its
subheader && the number of padding bit <= the size of the Long BSR
plus its subheader)
{
if( the number of LCG with allocated data > 1) --> Truncated BSR
else --> Short BSR
}
else {
1. Long BSR
}
```

Thus, for a Padding BSR, a Short BSR or a Truncated BSR may be sent in the BSR MAC CE of the MAC PDU, even if that excludes information on data buffered in some of the LCGs when the MAC PDU was assembled. This is due to bandwidth constraints in the Padding BSR.

Furthermore, even if a Regular BSR rather than a Padding BSR has been triggered by a MAC entity of the UE and the long type or short type may allocated as indicated above depending entirely on the number of LCGs that have data buffered for transmission. However, the information that is ultimately transmitted to the base station in the MAC PDU may exclude some of the LCGs. This is because a Logical Channel Prioritisation Procedure may initially determine that a Long BSR is appropriate for the Regular BSR, but subsequently determine that there is no room for the Long BSR based on the size of the UL grant. In this situation a Padding BSR may be sent instead of the more appropriate Long BSR. This may have the consequence that the recipient base station is unaware of the total volume of buffered data awaiting uplink transmission.

BSR cancellation and Scheduling Request (SR) policies may differ between LTE and 5G. for example, the LTE specification 3GPP TS 36.321 version 11.5.2.0 of July 2018 section 5.4.5 states in relation to cancellation of triggered BSRs:

"All triggered BSRs shall be cancelled in case the UL grant(s) in this Transmission Time Interval (TTI) can accommodate all pending data available for transmission but is not sufficient to additionally accommodate the BSR MAC control element plus its subheader. All triggered BSRs shall be cancelled when a BSR is included in a MAC PDU for transmission.

The MAC entity shall transmit at most one Regular/Periodic BSR in a TTI. If the MAC entity is requested to transmit multiple MAC PDUs in a TTI, it may include a Padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

NOTE 1: A Padding BSR is not allowed to cancel a triggered Regular/Periodic BSR, except for NB-IoT. A Padding BSR is triggered for a specific MAC PDU only and the trigger is cancelled when this MAC PDU has been built."

This may be considered to be an LTE BSR trigger cancellation policy, which differs from the NR BSR trigger cancellation policy and thus a selcted BSR trigger cancellation policy may differ depending on the type of Radio Access Technology (RAT), such as LTE, NR and any previous or subsequent RAT.

The corresponding NR specification 3GPP TS 38.321 version 15.2.0 of June 2018 section 5.4.5 states:

"All triggered BSRs may be cancelled when the UL grant(s) can accommodate all pending data available for transmission but is not sufficient to additionally accommodate the BSR MAC CE plus its subheader. All BSRs triggered prior to MAC PDU assembly shall be cancelled when a MAC PDU which includes a BSR MAC CE is transmitted."

This may be denoted an NR BSR trigger cancellation policy, which may be modified according to some embodiments.

The BSR triggers are issued in response to certain conditions, as described above. Once a BSR has been triggered then a corresponding BSR MAC CE is to be generated (provided the UE has received an UL grant), the BSR MAC CE to include Buffer Status Report information corresponding to a buffered data quantity pertaining to one LCG (short BSR) or all LCGs (Long BSR) or a subset of LCGs (truncated BSR or padding BSR) at a given point in time. The relevant point in time may be the time of MAC PDU assembly or the time of BSR MAC CE generation. When a BSR is triggered it will be pending until cancelled. If there is already an UL grant that can be used by the UE to transmit a BSR MAC CE responsive to a corresponding BSR trigger then that UL resource may be used to transmit to a base station the corresponding BSR MAC CE in a MAC PDU. However, if no UL grant is available at a time the BSR is triggered then a Scheduling Request may be triggered to obtain an UL grant and then UL resources allocated in response to the Scheduling Request may subsequently be used to transmit the BSR MAC CE corresponding to the triggered BSR. Once the BSR MAC CE has been transmitted, at least a subset of the pending BSRs and any corresponding Scheduling requests maybe cancelled. Appropriate cancellation ensures efficient allocation of UL resources and avoids wasting bandwidth.

In relation to the Scheduling Requests (SRs), which may be issued responsive to BSR triggers, LTE specification 3GPP TS 36.321 version 15.2.0 of July 2018 section 5.4.3 states:

"When an SR is triggered, it shall be considered as pending until it is cancelled. All pending SR(s) shall be cancelled and sr-ProhibitTimer and ssr-ProhibitTimer shall be stopped when a MAC PDU is assembled and this PDU includes a BSR which contains buffer status up to (and including) the last event that triggered a BSR (see subclause 5.4.5), . . . "

This may be considered an LTE SR trigger cancellation policy.

A Scheduling Request (SR) is used for requesting UL-SCH resources for new transmission in both LTE and 5G.

In relation to cancellation of Scheduling Requests (SRs), the NR specification 3GPP TS 38.321 version 15.2.0 of June 2018 section 5.4.5 states:

"When an SR is triggered, it shall be considered as pending until it is cancelled. All pending SR(s) triggered prior to the MAC PDU assembly shall be cancelled and each respective sr-ProhibitTimer shall be stopped when the MAC PDU is transmitted and this PDU includes a BSR MAC CE which contains buffer status up to (and including) the last event that triggered a BSR (see subclause 5.4.5) prior to the MAC PDU assembly. All pending SR(s) shall be cancelled when the UL grant(s) can accommodate all pending data available for transmission."

According to the present technique, it is recognised that where a Regular BSR has been triggered and a Long BSR has been deemed appropriate based on the number of LCGs with buffered data for transmission, the size of the UL grant may not be sufficient to accommodate a Long BSR, resulting in a Padding BSR or Truncated BSR being included in the BSR MAC CE instead of the Long BSR. Regardless of this, the triggered BSR(s) up to and including the last event that triggered a BSR prior to MAC PDU assembly may be cancelled. This may have the consequence that the base station is unaware of data awaiting transmission in some LCGs. The Padding BSRs and Truncated BSRs that are sometimes used in lieu of Long BSRs do not accurately represent an up to date buffer status.

Thus, the present technique involves performing a BSR cancellation test, which in the case of NR, only cancels existing BSR triggers if the BSR MAC CE included in the MAC PDU covered all LGCs that had data available for UL transmission when the BSR MAC CE was assembled. Note that although there is a Transmission Time Interval of 1ms in LTE, 5G has no TTI. In 4G assembly and transmission of a MAC PDU are more likely to be closely spaced than in 5G. Thus in 5G, one or more BSR triggers may occur after MAC PDU assembly but prior to transmission of the same MAC PDU.

For 5G, the MAC entity 154, 156 may be configured with zero, one, or more SR configurations. An SR configuration may consist of a set of PUCCH resources for SR across different bandwidth parts and cells. For a logical channel, at most one PUCCH resource for a given SR configuration is configured per bandwidth part.

Each SR configuration corresponds to one or more logical channels. Each logical channel may be mapped to zero or one SR configuration, which is configured by the RRC. The SR configuration of the logical channel that triggered the BSR (if such a configuration exists) is considered as a corresponding SR configuration for the triggered SR.

Since the SRs are linked to the BSR triggers, according to the present technique the cancellation of SRs is aligned with the new BSR cancellation test. In particular, all pending SR(s) triggered prior to the MAC PDU assembly shall be cancelled and each respective sr-ProhibitTimer shall be stopped when the MAC PDU is transmitted and this PDU includes a BSR MAC CE which contains buffer status up to (and including) the last event that triggered a BSR prior to the MAC PDU assembly, and this buffer status covers all LCGs which had data available for transmission when the BSR MAC CE was built.

This aligns SR and BSR cancellation procedures for NR, thereby avoiding an undesirable situation where an SR is cancelled while a corresponding BSR is still pending, which could deprive the UE of UL resource to communicate the still triggered BSR to the NR base station.

Figure 2:
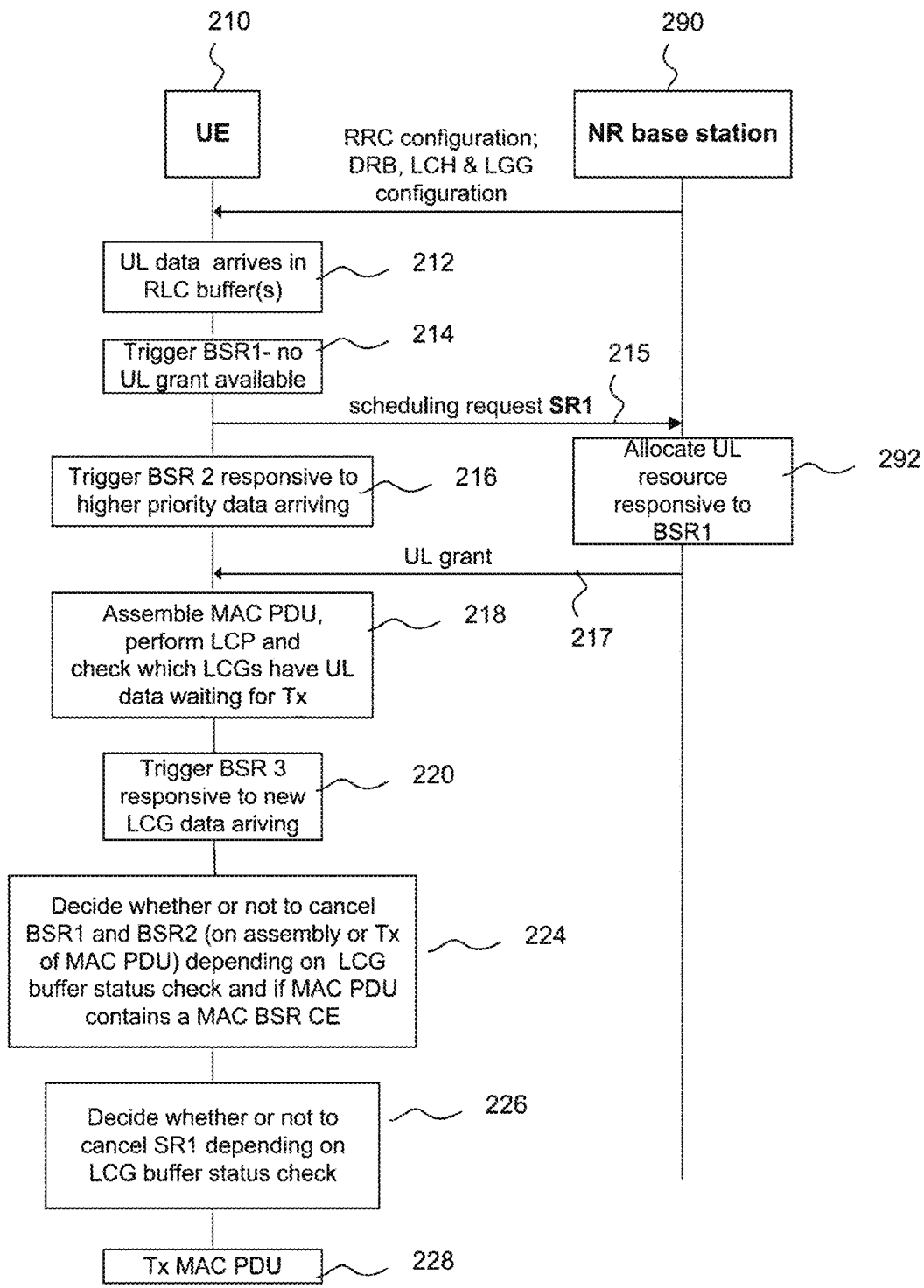
FIG. 2 schematically illustrates a communication sequence between a User Equipment (UE) and a New Radio (5G) base station.

FIG. 2 schematically illustrates a communication sequence between a UE 210 and an NR base station 290. Initially, the NR base station 290 sends a communication 291 the UE 210 Radio Resource Control (RRC) connection reconfiguration information for NR, Data Radio bearer configuration information, LCH configuration information and LCG configuration information. Then at box 212 in the UE 210, uplink data arrives in the RLC buffers and/or the PDCP buffers. Responsive to arrival of the new UL data satisfying one of the predetermined BSR triggering conditions described above, a first BSR trigger is generated by an NR MAC entity of the UE 210 at box 214 when no uplink grant is currently available for the relevant LCGs. Thus a scheduling request 215 is issued form the UE 210 to the NR base station 290. In response to the receipt of the scheduling request 215, the NR base station allocates UL resource to the UE at box 292, which is communicated by an UL grant signal 217. After issuance of the scheduling request 215, the UE 210 at box 216 generates a second BSR trigger responsive to higher priority data in the UL buffers than the data associated with the first BSR trigger 214. Once an UL grant is available to the UE, then at box 218, the UE 210 assembles a MAC PDU and concurrently checks which LCGs have data awaiting UL transmission. A BSR MAC CE may be included in the MAC PDU and may include the buffer status information relevant to both the first BSR trigger 214 and to the second BSR trigger 216. After assembly of the MAC PDU is complete at box 218 and subsequently at box 220, a third BSR trigger is generated by a MAC entity of the UE 210 at box 220. The third BSR trigger is too late for inclusion in the MAC PDU assembled at box 218. At around the same time as MAC PDU assembly at box 218 a Logical Channel Prioritisation (LCP) process is performed. LCP maybe performed responsive to the UL grant signal 217.

For NR, the LCP process involves deciding at the outset, purely based on the number of LCGs with buffered data for transmission, an appropriate BSR MAC CE to include in the MAC PDU (e.g. Long BSR or Short BSR). This initial decision does not take into account a size of an UL grant on which the MAC PDU is to be sent. It is more computationally efficient to allocate the BSR MAC CE in this way although in principle an available bandwidth in the corresponding UL grant could be predicted. A situation can arise whereby at the end of the LCP process, close to finalisation of the MAC PDU assembly, the initial allocation of BSR MAC CE is changed due to lack of available UL bandwidth in the UL grant. This change of allocation can lead to a gap in the reporting of some LCG buffers having UL data awaiting transmission due to the way that BSR triggers are cancelled, assuming that the initially allocated BSR MAC CE was transmitted to the base station.

At box 224 a BSR cancellation test is performed to decide whether or not to cancel the first BSR trigger 214 and the second BSR trigger 216. This BSR cancellation test involves a check to correlate the contents of any BSR MAC CE included in the MAC PDU assembled at box 218 with the LCG buffer status at a time corresponding to the MAC PDU assembly at box 218. The MAC PDU may not always include a BSR MAC CE, but cancellation of BSR triggers may be performed only where the MAC PDU does contain a BSR MAC CE corresponding to one of more BSR triggers. Then after the BSR cancellation test has been performed, at box 226 a decision is made whether or not to cancel at least one of the first BSR trigger 214 and the second BSR trigger 216. These triggers will be cancelled only if the relevant buffer status information was included in the MAC PDU assembled at box 218. In some examples, only buffer status information relevant to the first BSR trigger 214 may have been included in the MAC PDU, in which case the first BSR trigger 214 may be cancelled but the second BSR trigger 216 will remain active. In other examples the MAC PDU may have been devoid of up to date buffer status information corresponding to BSR 1 and BSR2, in which case neither of the two triggers is cancelled. Finally, at box 228, the MAC PDU that was assembled at box 218 is transmitted to the NR base station 290.

Since the third BSR trigger 220 was generated after assembly of the PDU at box 218, it is not a candidate for cancellation because the updated buffer status information that it contains arrived too late for inclusion in the MAC PDU that was assembled at box 218.

Although FIG. 2 shows the BSR cancellation test being performed around the time of the MAC PDU assembly, in alternative embodiments it could be performed just before or soon after transmission of the MAC PDU at box 226. Similarly the cancellation of pending triggered BSRs responsive to an outcome of the BSR cancellation test may be performed at a stage of MAC PDU (and hence BSR MAC CE) assembly, or alternatively may be performed at a stage of MAC PDU transmission.

Figure 3A:
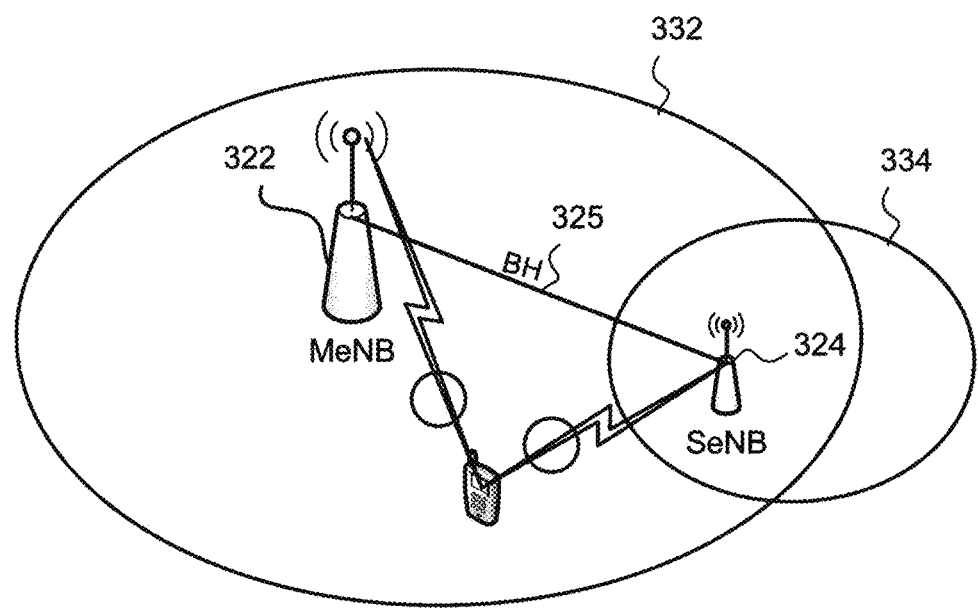
FIG. 3A schematically illustrates a having a simultaneous dual connection to both a Master base station and a Secondary base station.

FIG. 3A schematically illustrates a UE 310 having a simultaneous dual connection to both a Master base station 322 and a Secondary base station 324. A backhaul link 325 is provided for communication between the Master 322 and Secondary 324 base stations. A Master cell 332 is an area within which the UE can form a wireless connection with the Mater base station 322. A Secondary cell 334 is an area within which the UE 310 can form a wireless connection with the secondary base station. There is an overlap region between the Master cell 332 and the Secondary cell 334. In the case of EN-DC, the UE can simultaneously form an NR wireless connection and an LTE wireless connection at least within the overlap region. In some implementations the master base station 322 is an LTE base station whilst the Secondary Base station is an NR base station. However, in alternative implementations the Master base station 322 is an NR base station whilst the Secondary Base station is an LTE base station. Each of the communications links in the FIG. 3A embodiment may use carrier aggregation and thus there may be a Master Cell Group associated with the Master base station 322 and/or there may be a Secondary Cell Group associated with the Secondary base station 324.

Multi-RAT Dual Connectivity (MR-DC) is a generalization of the Intra-E-UTRA Dual Connectivity (DC) described in 3GPP TS 36.300 version 15.2.0 of July 2018, where a multiple receive/transmit UE may be configured to utilise resources provided by two different nodes connected via a non-ideal backhaul, one providing LTE (or E-UTRAN) access and the other one providing NR access. One node 322 acts as the Master Node and the other as the Secondary Node 324. The Master Node 322 and Secondary Node 324 may be connected via a network interface and at least the Master Node322 is connected to the core network. MR-DC is currently designed based on the assumption of non-ideal backhaul 325 between the different nodes but can also be used in case of ideal backhaul 325.

Figure 3B:
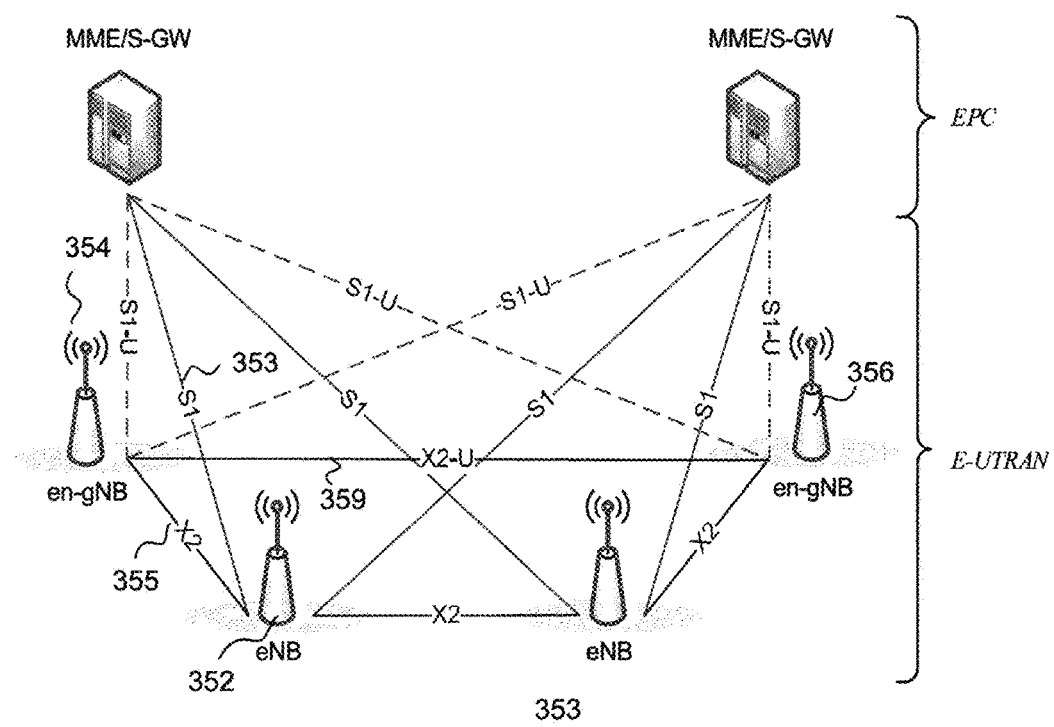
FIG. 3B schematically illustrates one example E-UTRAN NG Dual Connectivity (EN-DC) architecture.

FIG. 3B schematically illustrates one example EN-DC architecture. Evolved Terrestrial radio Access Network (E-UTRAN) supports MR-DC via E-UTRA-NR Dual Connectivity (EN-DC), in which a UE (not shown) is connected to one LTE base station 352 that acts as a Master Node and one NR base station 354 (sometimes denoted a gNodeB) that acts as a Secondary Node. The LTE base station 352 may be connected to the Evolved Packet Core of LTE via an S1 interface 353 and to the NR base station 354 via an X2 interface 355. The NR base station 354 might also be connected to the EPC via an S1-U interface 357 and to other NR base stations 356 via an X2-U interface 361.

Figure 4:
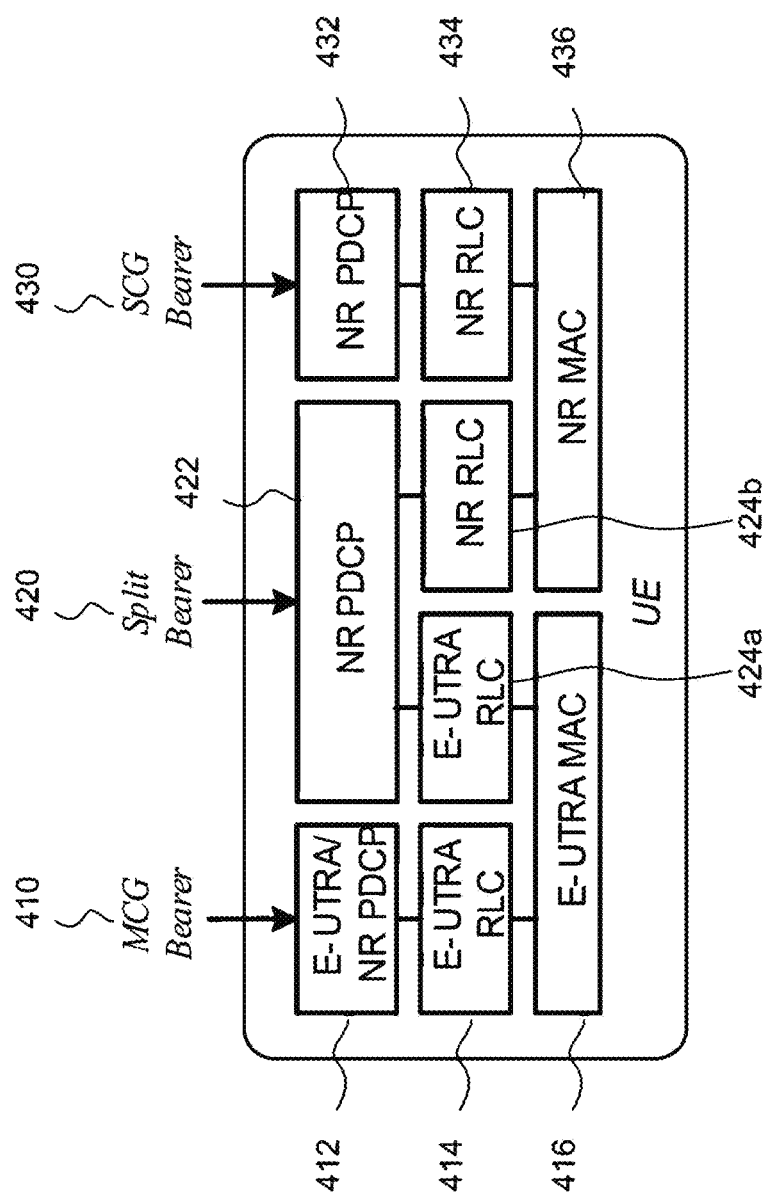
FIG. 4 schematically illustrates three different bearer types for EN-DC.

FIG. 4 schematically illustrates three different bearer types for EN-DC. The three bearer types are a Master Cell Group (MCG) bearer 410, a split bearer 420 and a Secondary Cell Group (SCG) Bearer 430. In this example, the MCG bearer 410 has either an E-UTRA (LTE) or an NR Packet Data Convergence Protocol (PDCP) entity 412, an E-UTRA Radio Link Control (RLC) RLC entity 414 and an E-UTRA MAC entity 416. The split bearer 420 has an NR PDCP entity 422 which connects to both an E-UTRA RLC entity 424a and an NR RLC 424b. The E-UTRA RLC 424a connects to the E-UTRA MAC 416 like the MCG bearer 410. The NR RLC 424b of the split bearer 420 connects to an NR MAC 436 associated with the SCG bearer 430.

A split bearer at least in the context of Dual Connectivity may be considered to be a bearer that is transmitted and received via both master and secondary base stations.

Similarly, to the MCG bearer 410, the SCG bearer 430 has an independent path through an NR PDCP entity 432, an NR RLC entity 434 and the NR MAC 436. Note that NR PDCP is used for all bearers except for the MCG bearers 410, which can be configured by the network to have either an E-UTRA PDCP or an NR-PDCP.

For the MCG bearer 410 only MCG radio resources are involved. For the SCG bearer 430, only SCG radio resources are involved. However, for the split bearer 420, both MCG and SCG radio resources are involved. The MCG bearer 410 and the SCG bearer 430 may be denoted "direct bearers". For the purposes of the present technique, note that in the case of EN-DC direct bearers the LTE MAC entity 416 and the NR MAC entity 436 are independent so that SR and BSRs triggered in the LTE MAC entity 416 are independent from those triggered in the NR MAC entity 436 and vice versa. However, in the case of the EN-DC split bearer 420, the LTE MAC 416 and the NR MAC 436 have some inter-dependency. Thus the triggering of SRs and BSRs by the LTE MAC 416 and the NR MAC 436 has some inter-dependency. The inter-dependent BSRs may be triggered in both the LTE MAC 416 and the NR MAC 436, due to the arrival of data for the UL split bearer but in some cases (see FIG. 6A example) the MAC PDU containing the corresponding BSR MAC CE may only be transmitted over one or the other of the LTE radio bearer and the NR radio bearer. In other cases, where an uplink buffer volume threshold is exceeded (see FIG. 6B example), two MAC PDUs containing inter-dependent BSR MAC CEs may be transmitted one over the LTE radio bearer and the other over the NR radio bearer.

Figure 5:
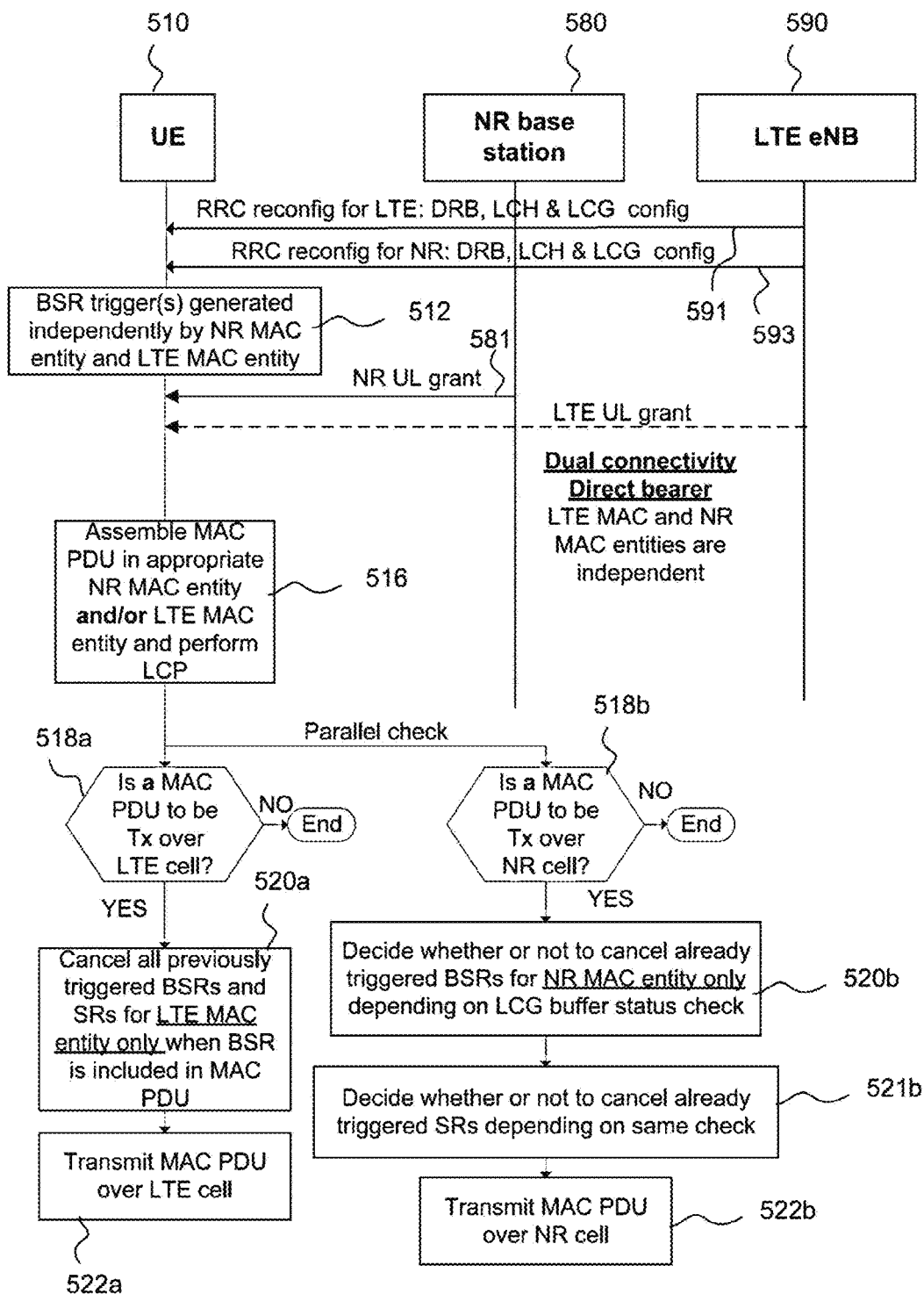
FIG. 5 schematically illustrates a communication sequence involving performing a Buffer Status Report (BSR) and Scheduling Request (SR) cancellation test in an EN-DC case for direct bearers.

FIG. 5 schematically illustrates a communication sequence involving performing a BSR and SR cancellation test in an EN-DC case for direct bearers. In this example a UE 510 has dual connectivity to an NR base station 580 and to an LTE eNB 590. The LTE eNB 590 is the Master node. In a first configuration communication 591, the LTE eNB 590 performs RRC connection configuration for LTE including DRB configuration, LCH configuration and LCG configuration. In a second configuration communication 593, the LTE eNB 590 also performs RRC connection configuration for NR, again including DRB configuration, LCH configuration and LCG configuration. Then at box 512, one or more BSR triggers are generated independently by the NR MAC entity and by the LTE MAC entity (not shown). If a BSR trigger is generated by the LTE MAC entity then an LTE SR may be triggered to obtain an LTE UL grant. However, if a BSR trigger is instead generated by the NR MAC entity then an NR SR may be triggered to result in an NR UL grant. The UE may have simultaneous direct radio bearer connections with both the NR base station 580 and the LTE eNB 590.

After an NR UL grant 581 for a new transmission is received, the UE performs Logical Channel Prioritisation (LCP) at and MAC PDU assembly at box 516. Each of MAC PDU assembly and the LCP are performed for the appropriate MAC entity at box 516. The LCP procedure allows the UE 510 to satisfy the Quality of Service of each radio bearer in an efficient way. In LTE, for example, a Prioritized Bit Rate (PBR) is defined for each logical channel, in order to transmit data in order of importance but also to avoid starvation of data with lower priority. The PBR is the minimum data rate guaranteed for the logical channel. Even if the logical channel has low priority, at least a small amount of MAC PDU space is allocated to guarantee the PBR. The LCP process at box 516 may initially determine that a Long BSR should be sent, but subsequently determine that there is no room for the Long BSR. At box 516, the UE also assembles a MAC PDU in the appropriate NR MAC entity and/or LTE MAC entity at box 516, depending on which BSRs were generated and which UL grants were received. In this particular example, only the NR UL grant 581 is received by the UE 510 so the MAC PDU is assembled in the NR MAC entity only. Once the MAC PDU has been assembled at box 516, a parallel check is performed via box 518a to determine if the MAC PDU is to be transmitted over the LTE cell (or over the MCG or generated by the LTE MCG MAC) and via box 518b to determine if the MAC PDU is to be transmitted over the NR cell (or over the SCG or generated by the NR SCG MAC).

At box 518a, if it is determined that a MAC PDU (one of a plurality) is in fact to be transmitted over the LTE cell then at box 520a, an LTE BSR cancellation policy is applied whereby all previously triggered BSRs and SRs for the LTE MAC entity only are cancelled provided that a BSR was included in the MAC PDU assembled at box 516. Then at box 522a the MAC PDU is transmitted over the LTE cell.

At box 518b, if it is determined that a MAC PDU is to be transmitted over the NR cell then at box 520b, an NR BSR cancellation policy modified according to the present technique is applied, whereby all previously triggered BSRs and SRs up to (and including) the last event that triggered a BSR for only the NR MAC entity (not the LTE MAC entity) prior to the BSR assembly at box 516 are cancelled provided that a BSR was included in the assembled MAC PDU and provided that it is verified that the MAC PDU included up tp date information on data buggered by all LCGs at the time of assembly of the MAC PDU. Then at box 522b the MAC PDU is transmitted over the NR cell.

Figure 6A:
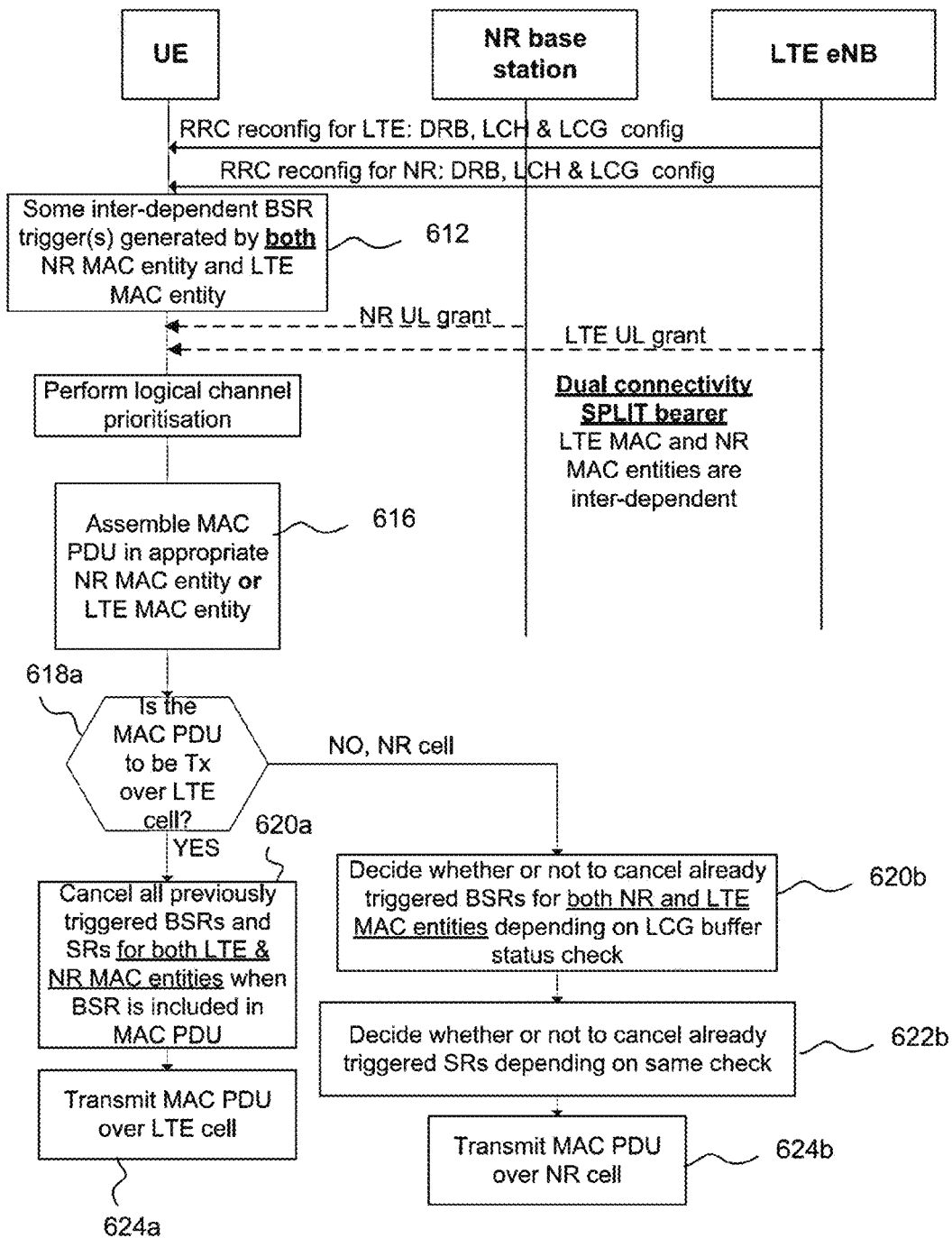
FIG. 6A schematically illustrates a communication sequence involving performing a BSR and SR cancellation test in an EN-DC case for split bearers.
Figure 6B:
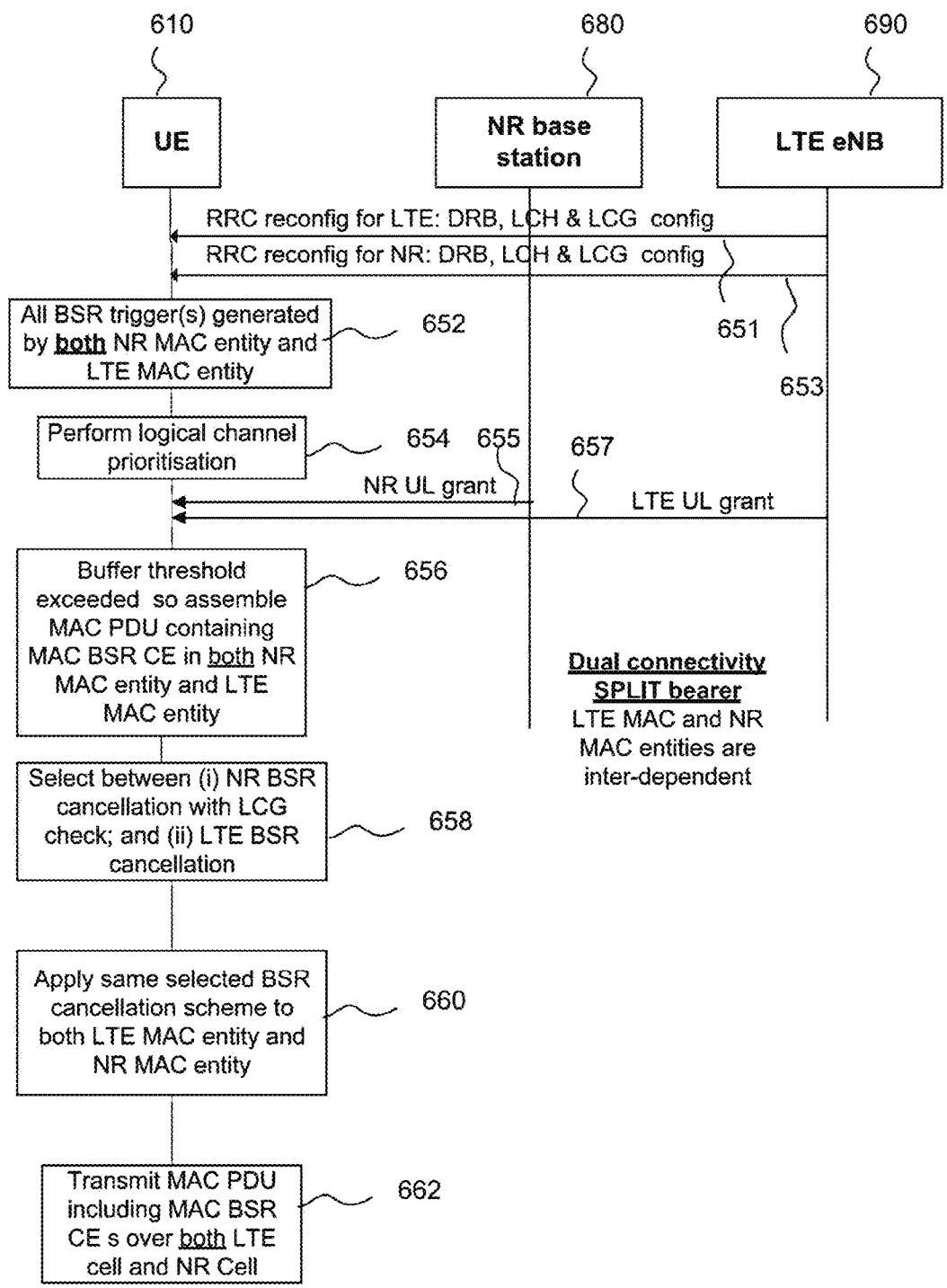
FIG. 6B schematically illustrates a BSR cancellation test performed in a dual connectivity system having a split bearer in which exceeding a buffer threshold means that the BSR trigger is transmitted to both the NR and the LTE base stations.

In the FIG. 5 embodiment at box 520a and at box 520b, the BSR trigger cancellation policy is selected to match the radio access technology type (LTE or NR) over which the MAC PDU (including the BSR MAC CE) is to be transmitted. However, comparison with FIG. 6A and FIG. 6B will show that selection of the BSR trigger cancellation policy depends not only on the RAT type, but also on the bearer type. FIG. 5 shows the policy choice for a direct bearer whereas FIG. 6A and FIG. 6B show two different policy choices in the case of data arriving for UL transmission on a split bearer. According to some embodiments, a choice of which BSR triggers to cancel and/or a choice of which SRs to cancel after assembly of a MAC PDU including a BSR MAC CE is complete depends on the bearer type. The bearer type may be selected from, for example, a split bearer type or a direct bearer type. Furthermore, in FIG. 5, different BSR trigger cancellation policies and different SR trigger cancellation policies may be selected to apply to a PDU depending on which type of MAC entity generated the MAC PDU.

FIG. 6A schematically illustrates a communication sequence involving performing a BSR and SR cancellation test in an EN-DC case for split bearers. The aspects that are identical to the FIG. 5 example for EN-DC direct bearers are described above. The FIG. 6A example differs from the FIG. 5 example at box 612, some BSR triggers pertaining to the UL split bearer are inter-dependently generated by both the NR MAC entity and the LTE MAC entity. It follows that when it is determined at box 618a that the MAC PDU is to be transmitted over the LTE cell (but not also the NR cell), all previously triggered BSRs are cancelled for both the LTE MAC entity and for the NR MAC entity. At box 616, the MAC PDU is assembled in one or the other of the NR MAC entity and the LTE MAC entity, which differs from the dual connectivity direct bearer case at box 516. At box 618a, when the answer is no meaning that the MAC PDU is to be transmitted over the NR cell (but not also the LTE cell), all BSRs triggered for both MAC entities prior to MAC PDU assembly are cancelled when the MAC PDU is transmitted at box 624b and this PDU includes a BSR MAC CE which contains buffer status up to (and including) the last event that triggered a BSR prior to the MAC PDU assembly at box 616, and this buffer status covers all LCGs which had data available for transmission when the BSR MAC CE was built.

In the case where the answer at box 618a is no, meaning that the MAC PDU is to be transmitted over the NR cell, all pending SR(s) triggered prior to the MAC PDU assembly at box 616 may be cancelled at box 622b and each respective "sr-ProhibitTimer" may be stopped when the MAC PDU is transmitted at box 624 and this MAC PDU includes a BSR MAC CE which contains buffer status up to (and including) the last event that triggered a BSR (see subclause 5.4.5 of 3GPP TS 38.321 version 15.2.0 of June 2018) prior to the MAC PDU assembly, and this buffer status covers all LCGs which had data available for transmission when the BSR MAC CE was built.

This aligns SR and BSR cancellation procedures for NR, thereby avoiding a situation that might otherwise occur whereby SR is cancelled while BSR is still pending.

Note that at box 624a when the MAC PDU containing a BSR MAC CE is transmitted over an LTE cell all previously triggered BSRs generated by the NR MAC entity as well as the LTE MAC entity are cancelled according to an LTE type BSR trigger cancellation policy. Similarly, at box 620b BSR triggers generated by an LTE MAC entity are subsequently cancelled using an NR type BSR trigger cancellation policy when the MAC PDU is transmitted over an NR cell. It might be counterintuitive to the skilled person to use a first RAT type BSR trigger cancellation policy when a second (different) RAT type MAC entity is being used to transmit the MAC PDU. In the example of FIG. 6A where a buffer threshold is not exceeded the BSR MAC CE may provide information of the total buffer contents corresponding to LCGs pertaining to the split bearer and being managed by both the NR MAC entity and the LTE MAC entity in a single BSR MAC CE. By way of contrast, for the embodiment of FIG. 6B below, where the PDCP data amount exceeds a threshold, a given BSR MAC CE provides information only on the LTE MAC entity or the NR MAC entity that generated it, and two BSR MAC CEs are reported.

FIG. 6B schematically illustrates a BSR cancellation test performed in a dual connectivity system having a split bearer where UL data exceeding a buffer threshold means that the BSR trigger is transmitted to both the NR and the LTE base stations. In FIG. 6B the UE 610 communicates with an LTE eNB 690 as a master node and with an NR base station 680 as a secondary node. To initiate communication sequence the master node 690 sends a first configuration message 651 to perform RRC connection reconfiguration for LTE including DRP configuration LCH configuration and LCG configuration. Next, a second configuration signal 653 is sent from the master node 690 to the UE 610 to perform RRC configuration for NR, which also includes DRP configuration, LCH configuration and LCG configuration.

Following the initial configuration setup by the master node 690, at the UE 610, at box 652 data arrives in the uplink buffers of the UE and as a result, one or more BSR triggers being generated. However due to the nature of the split bearer, the BSR triggers are generated by both the NR MAC entity and the LTE MAC entity in the UE 610. Next at box 654, logical channel prioritisation is performed by the UE to decide on an appropriate BSR MAC CE to build and to ensure that each logical channel is given an appropriate quality of service. In this case, a first uplink grant 655 is received from the NR base station 680 and a second uplink grant 657 is received from the LTE eNB 690. At block 656 an UL buffer threshold, such as a PDCP buffer threshold is exceeded, so a MAC PDU containing a MAC BSR CE corresponding to a BSR trigger is assembled in both the NR MAC entity and the LTE entity to correspond to the same BSR trigger because the condition exists in this example whereby a buffer threshold is exceeded. In this case two MAC PDUs containing inter-dependent BSR MAC CEs are generated and transmitted. The two MAC PDUs may not include exactly the same BSRs because there may be triggers not pertaining to the split bearer. The network makes sure that double scheduling does not occur. Because a split bearer is being used the network might otherwise, without intervention, use different BSR and SR cancellation mechanisms for the LTE cell group and for the NR cell group. This could undesirably result in the network not cancelling some of the twin triggers that exist in both MACs. To address this, according to the present technique at box 658 the UE selects between alternative BSR cancellation mechanisms. In this example a selection is made between:

(i) the BSR cancellation prescribed by 5G but modified according to the LCG buffer check according to the present technique to check that the buffer status included in the assembled MAC PDU is at box 616 covered all LCGs that had data available for transmission when the corresponding BSR MAC CE was built; and (ii) the LTE BSR cancellation mechanism according to which if the LTE MAC entity assembled a MAC PDU including a BSR MAC CE then all previously triggered BSR's are cancelled.

Once a single BSR cancellation mechanism is selected at box 658, next at block 660 the same selected BSR cancellation screen scheme is applied to both the LTE MAC entity and to the NR MAC entity of the UE 610. Then at box 662 a MAC PDU including the same BSR's is transmitted over each of the LTE cell group and the NR cell group. The example of FIG. 6B is similar to the example of FIG. 6A in that they both involve dual connectivity and a split bearer, the difference being that in the FIG. 6A example, the MAC PDU is assembled in one or the other of the NR MAC entity and the LTE MAC entity whereas in the FIG. 6B example the same BSR trigger information is sent in a MAC PDU to each of the LTE MAC entity and the NR MAC entity.

In FIG. 6B, instead of applying an NR BSR cancellation policy to MAC PDUs assembled by an NR MAC entity and applying an LTE BSR cancellation policy to MAC PDUs assembled by a LTE MAC entity, a single BSR policy is selected and uniformly applied to MAC PDUs generated to by both the NR MAC entity and the LTE MAC entity. Either the LTE BSR/SR trigger cancellation policy or the NR BSR/SR trigger cancellation policy may be selected, provided that the same policy is used for the MAC PDU assembled in both MAC entities. This policy can be applied to only those BSR triggers pertaining to the split bearer, or all pending BSR triggers.

Figure 7:
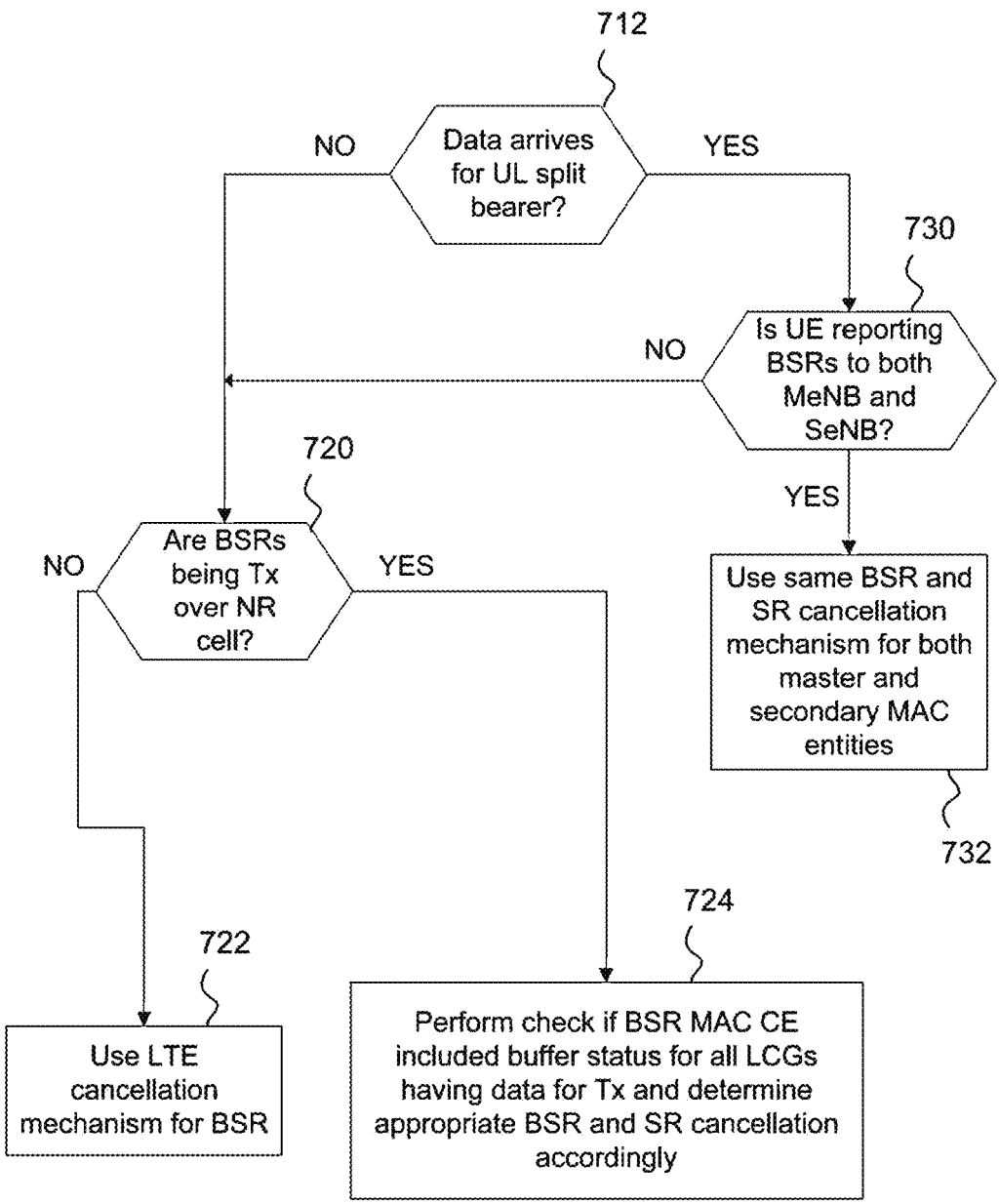
FIG. 7 is a flowchart schematically illustrating how BSR a cancellation mechanism and an SR cancellation mechanism is selected according to the present technique.

FIG. 7 is a flowchart schematically illustrating how a BSR cancellation mechanism and an SR cancellation mechanism is selected according to the present technique. At block 712 date arrives in an uplink buffer of a UE and it is determined whether or not the data is associated with a split bearer for an EN-DC capable UE. If it is determined at box 712 that the data is not to be transmitted via a split bearer then the process proceeds to block 720 where it is determined whether or not the BSRs are to be transmitted over an NR cell group. If at block 720 it is determined that the BSR is not to be transmitted over an NR cell group then it is assumed that an LTE cell group is to be used for transmission of the BSRs and the process proceeds to block 722 where an LTE cancellation mechanism is selected to cancel the BSR triggers and the SR triggers.

If on the other hand at box 720 it is determined that the BSRs are in fact are to be transmitted over the NR cell group then the process proceeds to block 724 whereupon a check is performed as to whether or not the BSR MAC CE included buffer status for all LCGs having data for transmission at the time that the corresponding MAC PDU was assembled. The appropriate BSR and SR cancellation strategy is decided accordingly. In particular, if the BSR MAC CE of the assembled MAC PDU did include an up-to-date buffer status for all LCGs then all BSRs and SRs triggered up to and including the point of MAC PDU assembly are cancelled. Otherwise, none of the BSR triggers may be cancelled if none of the buffer status information was included in the BSR MAC CE or only those BSR triggers for which the appropriate information was in fact included in the BSR MAC CE are selectively cancelled. The cancelled BSR triggers and SR triggers may thus correspond to a subset of the full set of BSRs triggered up to the point of assembly of the MAC PDU.

If at block 712 it is instead determined that the uplink data that has arrived is associated with a split bearer for EN-DC, then the process proceeds to block 730 where it is determined whether or not the UE should report each BSR to both the master node and the secondary node. In this example, the UE reports to both master and secondary nodes in the event that a buffer threshold is reached. Where the threshold is exceeded, the process proceeds to block 732 whereupon a given BSR cancellation mechanism selected. Provided that a given BSR cancellation mechanism is used by both the Master node MAC entity and the Secondary node MAC entity then the BSR cancellation and the SR cancellation should be efficient and effective. Either the LTE BSR cancellation mechanism or the NR cancellation mechanism with the LCG buffer status check may be used at box 732.

However, if at box 730 the UE is not required to report the BSR's the MAC PDU is to both the LTE base station (which is a Master node in this embodiments) and to the NR base station (which is a Secondary node in this embodiment) due to the UL data volume threshold not being exceeded, then the process proceeds to block 720 where the BSRs are transmitted over only one or the other of the LTE cell/cell group and the NR cell/cell group. In the FIG. 7 example, the master cell group corresponds to the LTE cell group, whereas the secondary cell group corresponds to the NR cell group. However in alternative examples, the master node could correspond to the NR cell group whilst the secondary node could correspond to the LTE cell group.

Figure 8:
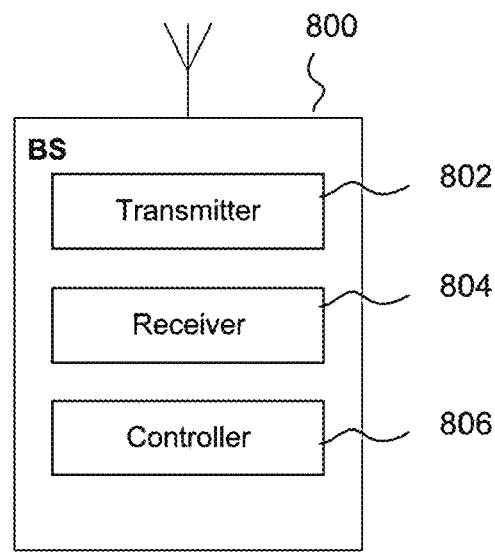
FIG. 8 provides a schematic diagram of the structure of a base station 800 which is arranged to operate in accordance with the examples of the present technique.

FIG. 8 provides a schematic diagram of the structure of a base station 800 which is arranged to operate in accordance with the examples of the present technique described above. The base station 800 includes a transmitter 802 arranged to transmit signals to a UE; a receiver 804 arranged to receive signals from the UE; and a controller 806 arranged to control the transmitter and receiver and to perform processing such as in accordance with the above described method of performing a BSR cancellation test to determine an appropriate BSR cancellation policy and optionally an SR cancellation policy. The base station may be a 5G base station or an LTE base station (LTE base station).

Figure 9:
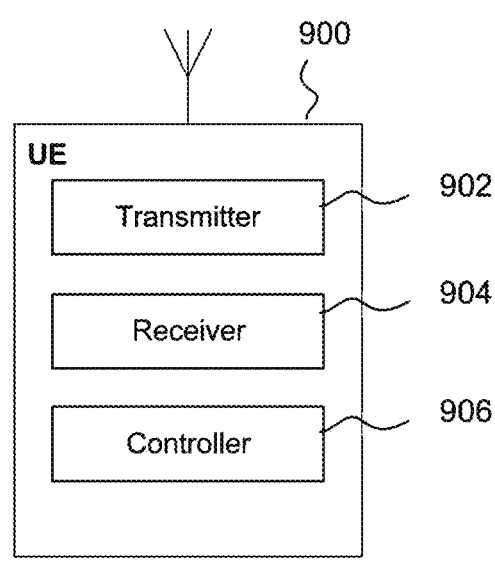
FIG. 9 provides a schematic diagram of the structure of a UE 900 which is arranged to operate in accordance with the examples of the present technique.

FIG. 9 provides a schematic diagram of the structure of a UE 900 which is arranged to operate in accordance with the examples of the present technique described above. The UE 900 includes a transmitter 920 arranged to transmit signals to the 5G base station and/or to an LTE base station; a receiver 940 arranged to receive signals from the 5G base station and/or from an LTE base station; and a controller 960 arranged to control the transmitter and receiver and to perform processing such as in accordance with the above described method of requesting performing a BSR cancellation test to determine an appropriate BSR cancellation policy and optionally and SR cancellation policy. The transmitter 902 and the receiver 904 may be part of Radio Frequency hardware and the controller 906 may comprise one or more general purpose or special purpose processor or processing circuitry.

Although in FIGS. 8 and 9 the transmitter, receiver, and controller have been illustrated as separate elements, any single element or plurality of elements which provide equivalent functionality may be used to implement the examples of the present technique described above.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The various embodiments of the present disclosure may also be implemented via computer executable instructions stored on a computer readable storage medium, such that when executed cause a computer to operate in accordance with any other the aforementioned embodiments.

The above embodiments are to be understood as illustrative examples of the disclosure. Further embodiments of the disclosure are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be used without departing from the scope of the disclosure, which is defined in the accompanying claims.

The invention claimed is:

1. A method of reporting a buffer status of a terminal, the method comprising:
   triggering a buffer status report (BSR) in a media access control (MAC) layer, based on a BSR triggering condition;
   transmitting, to a base station, a scheduling request (SR) for transmitting uplink data;
   receiving an uplink resource allocation grant (UL grant) from the base station, in response to the SR;
   assembling a media access control protocol data unit (MAC PDU) including a BSR MAC control element (BSR MAC CE); and
   cancelling all BSRs triggered prior to the MAC PDU assembly, at a time of transmitting the MAC PDU, in case that the BSR MAC CE includes buffer status information up to a last event that triggered the BSR prior to the MAC PDU assembly and the buffer status information covers all of more than one logical channel group (LCG) having data for transmission.

2. The method of claim 1, further comprising canceling the triggered BSR when the uplink resource allocation grant is able to accommodate all pending data available for uplink transmission and is not sufficient to accommodate the BSR MAC CE and a MAC sub-header.

3. The method of claim 1, further comprising:
   triggering the SR, based on a certain SR triggering condition;
   determining whether the triggered SR has been triggered prior to the MAC PDU assembly; and
   determining whether to cancel the triggered SR, based on a result of the determination of whether the triggered SR has been triggered prior to the MAC PDU assembly.

4. The method of claim 3, wherein the determining of whether to cancel the triggered SR comprises canceling the triggered SR, based on whether the BSR MAC CE contains buffer status information up to a certain event that triggers a BSR prior to the MAC PDU assembly.

5. The method of claim 3, further comprising canceling the triggered SR when the uplink resource allocation grant is able to accommodate all pending data available for uplink transmission.

6. The method of claim 3, further comprising stopping an sr-ProhibitTimer, when it is determined that the triggered SR is cancelled.

7. The method of claim 1, wherein the cancelling of the BSR is performed when the MAC PDU is transmitted to the base station.

8. The method of claim 3, wherein the determining of whether to cancel the triggered SR is performed when the MAC PDU is transmitted to the base station.

9. The method of claim 1, wherein the triggering of the BSR is performed after the MAC PDU is assembled and before the MAC PDU is transmitted.

10. A user equipment (UE) for reporting a buffer status, the UE comprising:
    a transceiver; and
    one or more processors coupled with the transceiver,
    wherein the is one or more processors are configured to:
       trigger a buffer status report (BSR) in a media access control (MAC) layer, based on a BSR triggering condition,
       transmit, to a base station, a scheduling request (SR) for transmitting uplink data,
       receive an uplink resource allocation grant (UL grant) from the base station, in response to the SR,
       assemble a media access control protocol data unit (MAC PDU) including a BSR MAC control element (BSR MAC CE), and
       cancel all BSRs triggered prior to the MAC PDU assembly, at a time of transmitting the MAC PDU, in case that the BSR MAC CE includes buffer status information up to a last event that triggered the BSR prior to the MAC PDU assembly and the buffer status information covers all of more than one logical channel group (LCG) having data for transmission.

11. The UE of claim 10, wherein the one or more processors are further configured to cancel the triggered BSR when the uplink resource allocation grant is able to accommodate all pending data available for uplink transmission and is not sufficient to accommodate the BSR MAC CE and a MAC sub-header.

12. The UE of claim 10, wherein the one or more processors are further configured to:

trigger the SR, based on a certain SR triggering condition,
determine whether the triggered SR has been triggered prior to the MAC PDU assembly, and
determine whether to cancel the triggered SR, based on a result of the determination of whether the triggered SR has been triggered prior to the MAC PDU assembly.

13. The UE of claim 12, wherein the one or more processors are further configured to cancel the triggered SR, based on whether the BSR MAC CE contains buffer status information up to a certain event that triggers a BSR prior to the MAC PDU assembly.

* * * * *